April 17, 1934.  W. J. FRASER  1,954,926
PROCESS OF MAKING TIRES
Filed Sept. 15, 1933
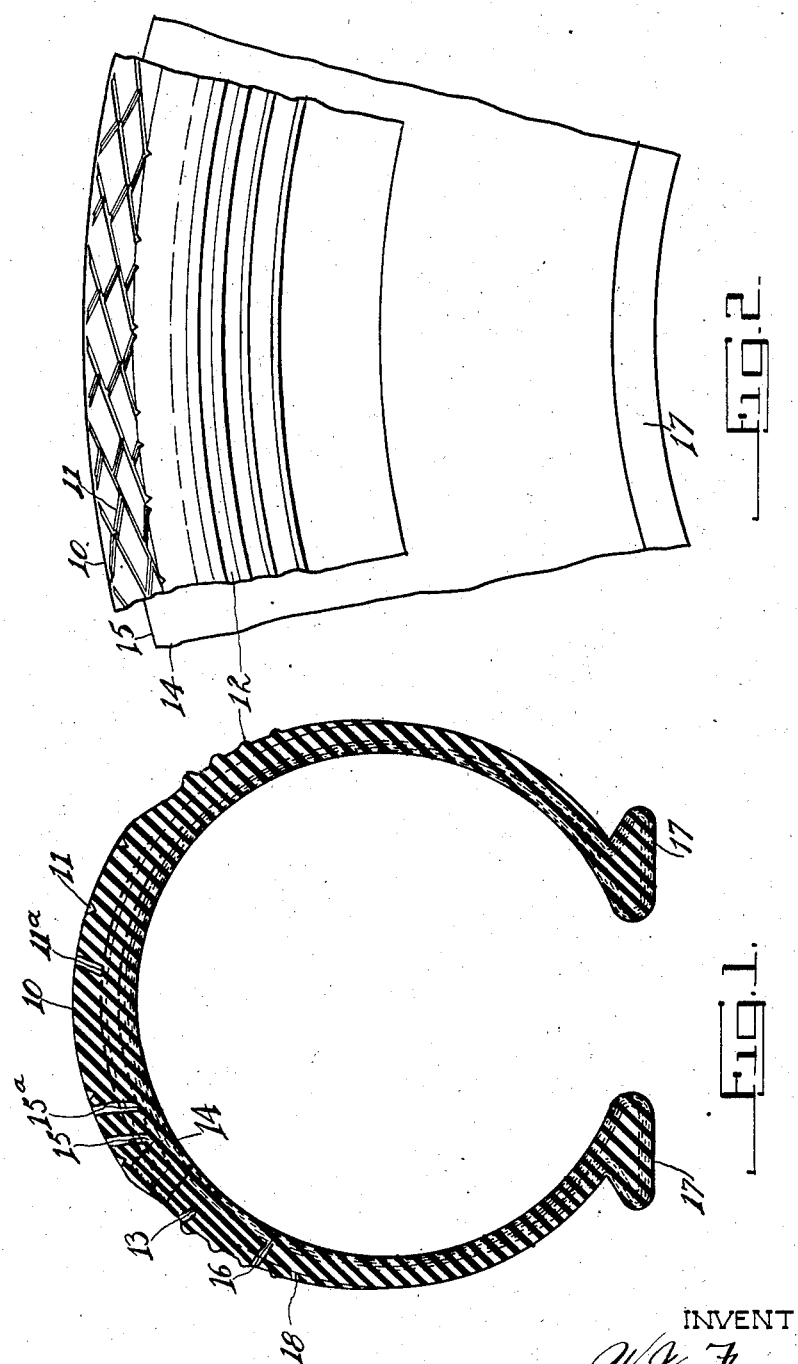
INVENTOR
W. J. Fraser
BY J. Edw. Maybee
ATTY Patented Apr. 17, 1934

1,954,926

UNITED STATES PATENT OFFICE 1,954,926

PROCESS OF MAKING TIRES

William J. Fraser, Toronto, Ontario, Canada

Application September 15, 1933, Serial No. 689,533
In Canada January 7, 1930

3 Claims. (Cl. 154—14)

My invention relates primarily to tires and tire making, and has for its objects the provision of a new and improved tire and the method and apparatus by which it is produced. Generally stated, my novel tire results from the combination of a plurality of old tires, preferably two, into a unitary tire structure possessing all the qualities desirable in a tire; the product itself, as well as the method of production, being highly efficient and relatively cheap. It is to be understood, however, that certain features of the invention are adaptable for use with products other than tires.

To the above and other ends which will be subsequently set forth my invention consists in the features of construction, methods of operation, combinations of devices and arrangements of parts hereinafter described and particularly pointed out in the appended claims.

In carrying out my invention, I preferably make up, manufacture or produce a unitary structure comprising two main parts which I denominate, respectively a "shoe" and a "glove".

The shoe or inner portion is usually a tire whose tread is more or less worn. The glove or outer portion is usually a part of a used tire and includes the tread, part of the sidewalls, and ordinarily part of the fabric.

The process whereby the product is obtained involves causing the glove to apply a compressing force to the shoe and to firmly grip the shoe; and also involves the union or welding of the two preferably by heat and pressure into a unitary structure, an interposed uniting layer serving as an adherent, all in the manner hereinafter set forth.

I obtain a practically new tire having a reenforced outer portion or tread.

These and other features and objects of my invention will be understood from the following description and accompanying drawing.

Fig. 1 is a transverse section of a tire embodying the invention, the pneumatic member or inner tube being omitted; and Fig. 2 a side elevation of part of such a tire.

Referring to the form of the invention as disclosed in the drawing, the outer tire part or glove, designated as a whole by the numeral 10, is preferably formed of a part of a tire casing of which the beads and main portion of the sidewalls and one or more of the plies of fabric have preferably been discarded; which greatly reduces the weight and also permits the attainment of high flexibility and resiliency. The glove 10 is shown as being made up of the tread 11 and breaker-strip 11a and the sidewall portions 12, and usually with the fabric ply 13.

The shoe, designated as a whole by the numeral 14, is formed of the tread portion 15 with breaker-strip 15a and the fabric plies 16 of the second tire, which plies extend to and form part of the beads 17. Interposed between the shoe and the glove there is a bond of elastic and resilient character, said bond being indicated by the numeral 18.

In the present invention, it is important that the relative external circumference of the shoe with reference to the internal circumference of the glove be such that when the parts are assembled and placed under internal air pressure, the glove will closely fit the shoe. Furthermore, for best results, the circumferential tension imposed upon the glove should be of a considerable amount.

In building up my improved tire structure, I interpose a thin layer of vulcanized rubber, or rubber cement, between the glove and the shoe to form an adhesive resilient bond between the two parts. This adhesive element should be of a character to vulcanize at a temperature lower than usual vulcanizing temperatures and may be vulcanized under heat and pressure, as hereinafter described.

In making tires heretofore, it has been the practice to join the parts by bringing surfaces together in a tacky condition. But if it were attempted to bring together the surfaces of my shoe and glove in this condition, all accommodation by any sliding action of one over the other after contact has been made, would be effectively prevented owing to the closeness of the fit between the parts. In assembling the parts according to my invention, I provide means whereby the elements may be conveniently adjusted to proper relationship by permitting sliding of the surfaces relatively to each other, so that the parts tend to assume, on their own account, a proper relationship to give a harmonious union throughout, with the stresses thoroughly equalized. My invention further permits, where necessary, the ready adjustment of the parts, manually or by other means, where they have not naturally assumed their proper relationship. Thus the parts, when assembled, tend to assume of themselves a proper relationship circumferentially, but adjustment of the glove laterally with reference to the shoe is sometimes necessary to bring them to their proper and final relative position laterally. I accomplish this positioning of the parts and equalization of stresses by what I have designated the "slime process".

In the assembling of the parts of my improved tire, either the interior surface of the glove, or the exterior surface of the shoe, is first faced with a thin layer of the adhesive bonding element, such as the usual rubber compound or cushion gum, commonly used in the uniting of rubber surfaces. It will usually be found more convenient to face the interior surface of the glove with this layer of adhesive material. This adhesive element is tacky and adheres to the member to which it is applied, for example, to the inside surface of the glove.

When the shoe and glove are to be united, assuming that the adhesive layer has been applied to the interior surface of the glove, the outer surface of the shoe may be moistened with a solvent for the rubber compound, or bonding gum, and such a solvent may be gasoline. The interior surface of the glove with its sheet of adhesive element is bathed in a solvent, such as by plunging it into a tub of gasoline and the surplus gasoline is allowed to drain off.

The shoe is then inserted within the glove. This may be conveniently accomplished by placing one part of the shoe within a part of the glove, the glove being secured against movement, and the opposite part of the shoe then pushed inwardly to double on itself and then allowed, to expand or snap back within the remaining portion of the glove, the shoe thus seating itself within the glove. In some cases it is preferable to spread the beads of the shoe apart, causing a temporary reduction of its circumference and enabling the glove to be slipped on. The glove is then adjusted, where necessary, to proper position laterally with reference to the shoe along the entire circumference. This adjustment is readily permitted by reason of the easy sliding action of one part over the other to permit the parts to assume a natural relationship and attain a normally equalized position of all parts. The solvent used readily diffuses into the air and through the rubber, so that the assembled parts retain a permanent position relatively to each other.

The assembled parts are now ready for the stage usually next in the process which is the vulcanization of the bond in a suitable mold. In this stage, for best results, the temperature is kept below the temperature at which the parts were originally vulcanized.

It should be further particularly explained with reference to my completed tire, that the structure is such as to cause the inner edges of the glove to form an extension of rubber; and these edges of rubber are united by the bonding element directly to the rubber of the sidewall of the shoe. This result is secured by skiving the inner portions of the edges of the glove before application to the shoe so that the rubber extends a greater distance over the shoe at the edges than the fabric.

Although I have described my improved tire as being composed of a shoe and glove combined, more than one glove, if desired, may be superimposed in the same way.

I claim as my invention:

1. The method of making a tire having an inner main portion and an outer circumferential portion, which comprises applying a yieldable bonding material to the surface of at least one of the said portions which engages the surface of the other portion; applying material to at least one of the engaging surfaces for causing said surfaces to be slidable with reference to each other; and applying the outer part over the inner.

2. A process of making a tire structure of an annular shoe element of vulcanized rubber and fabric and an annular tread element having a tread of vulcanized rubber, which comprises adhering to one of the opposed surfaces of the two elements a vulcanizable bonding material; providing, on at least one of the opposed elements, a surface adapted to permit sliding of the surfaces relative to one another while said elements are being assembled; and placing the tread on the shoe in correct position.

3. The method of making a tire having an annular shoe element of vulcanized rubber and fabric and an annular tread element having a tread of vulcanized rubber, which consists in adhering to one of the opposed surfaces of the two elements a vulcanizable bonding material; treating said bonding material to permit of a sliding movement of the surfaces relative to one another while said elements are being assembled; and placing the tread element on the shoe element in correct position.

WILLIAM J. FRASER.